United States Patent

Itoh et al.

[11] Patent Number: 5,981,670
[45] Date of Patent: Nov. 9, 1999

[54] ALKENYL-FUNCTIONAL SILYLATED POLYMETHYSILSES QUIOXANE AND METHOD OF PREPARING THE SAME

[75] Inventors: Maki Itoh, Kanagawa; Akihito Sakakibara-Saitoh, Shizuoka; Michitaka Suto, Kanagawa, all of Japan

[73] Assignee: Dow Corning Asia, Ltd., Tokyo, Japan

[21] Appl. No.: 09/028,257

[22] Filed: Feb. 23, 1998

[30] Foreign Application Priority Data

Feb. 24, 1997 [JP] Japan .................................. 9-039473

[51] Int. Cl.$^6$ ................................ C08F 283/12
[52] U.S. Cl. ......................... 525/478; 525/477; 528/31; 528/34; 528/32; 528/15
[58] Field of Search .................... 252/477, 478; 528/31, 32, 34, 15

[56] References Cited

U.S. PATENT DOCUMENTS

| | | | |
|---|---|---|---|
| 4,349,609 | 9/1982 | Takeda et al. | 428/429 |
| 4,399,266 | 8/1983 | Matsumura et al. | 528/10 |
| 4,652,618 | 3/1987 | Sumida et al. | 525/478 |
| 4,895,914 | 1/1990 | Saitoh et al. | 525/478 |
| 5,491,203 | 2/1996 | Matsui et al. | 525/474 |

FOREIGN PATENT DOCUMENTS

| | | | |
|---|---|---|---|
| 868996 | 4/1971 | Canada | 402/24 |
| 0406911 | 1/1991 | European Pat. Off. | |

OTHER PUBLICATIONS

Wacker–Chemie GmbH; Wacker Silicone Resin MK (Methyl polysiloxane); SME 10–146.8110 (replacing SME 10–114.793).

Wacker–Chemie GmbH; Munich, Mar. 1984; Methyl Silicone Resins.; SME 10–160.843.

Wacker–Chemie GmbH; Munich, Jan. 1983; Wacker Silicone Resin Solution HK 15; SME10–152.831.

Chem. Rev., 1995, vol. 95, pp. 1409–1430.

*Primary Examiner*—Robert Dawson
*Assistant Examiner*—Caixia Lu-Rutt
*Attorney, Agent, or Firm*—Arne R. Jarnholm; Timothy J. Troy

[57] ABSTRACT

An alkenyl-functional silylated polymethylsilsesquioxane that contains no more than 0.12 residual silanol per Si atom and is obtained by silylating the silanol in starting polymethylsilsesquioxane. The starting polymethylsilsesquioxane has a predetermined number average molecular weight, Mn, from 380 to 2,000 and is represented by the general formula $$(CH_3SiO_{3/2})_n(CH_3Si(OH)O_{2/2})_m$$

wherein m and n are positive numbers that provide the predetermined Mn, with the proviso that the value of $m/(m+n)$ is less than or equal to $0.152/(Mn \times 10^{-3})+0.10$ and greater than or equal to $0.034/(Mn \times 10^{-3})$. The alkenyl-functional silylated polymethylsilsesquioxane has the formula $$(CH_3SiO_{3/2})_n(CH_3Si(OH)O_{2/2})_{m-k}(CH_3Si(OSiR^1R^2R^3)O_{2/2})_k$$

wherein k is a positive number smaller than A, $(m-k)/(m+n)$ is less than or equal to 0.12, and $R^1$, $R^2$ and $R^3$ are each selected from substituted and unsubstituted monovalent hydrocarbon groups with the proviso that at least 1 of said $R^1$, $R^2$, and $R^3$ is a group that contains a crosslinkable carbon—carbon double bond.

5 Claims, 1 Drawing Sheet

ALKENYL-FUNCTIONAL SILYLATED POLYMETHYSILSES QUIOXANE AND METHOD OF PREPARING THE SAME

1. FIELD OF THE INVENTION

The present invention relates to reactive group-functional polymethylsilsesquioxane, to a method for its preparation, and to curable compositions that use said reactive group-functional polymethylsilsesquioxane.

2. DESCRIPTION OF THE PRIOR ART

Silicone resins that contain 1.5 oxygen atoms per silicon atom are generically known as polyorganosilsequioxanes. Polyorganosilsequioxanes are highly heat resistant and exhibit good electrical insulation properties and flame retardancy, and this good property spectrum has resulted in their use as resist materials and interlayer dielectric films in semiconductor fabrication (see, among others, "Shirikoon Handobukku" (English title: Silicone Handbook), edited by Kunio Itoh, published by Nikkan Kogyo Shinbunsha (1990)).

Methods are already known for the synthesis of polymethylsilsesquioxanes. For example, polymethylsilsesquioxane can be synthesized by dissolving methyltrichlorosilane in the presence of amine in a single solvent or mixture of solvents selected from ketones and ethers, adding water to this system dropwise to effect hydrolysis, and then heating to effect condensation (see Japanese Patent Publication (Kokoku) Numbers Sho 60-17214 (17,214(1985) and Hei 1-43773 (43,773/1989) and U.S. Pat. No. 4,399,266). Another synthesis example is taught in EP 0 406 911 A1 and Japanese Patent Publication (Kokoku) Number Sho 62-16212 (16,212/1987). These references teach the dissolution of a trifunctional methylsilane in organic solvent; then hydrolysis by the dropwise addition of water to this solution at a temperature from −20° C. to −50° C. under an inert gas pressure of 1,000 to 3,000 Pa; and thereafter condensation by heating. Yet another synthesis example is disclosed in Japanese Patent Application Laid Open (Kokai or Unexamined) Number Hei 3-20331 (20,331/1991). This reference teaches the reaction in organic solvent of methyltriacetoxysilane with an equivalent amount of alcohol and/or water to synthesize the alkoxyacetoxysilane; polycondensation of the alkoxyacetoxysilane in organic solvent in the presence of sodium bicarbonate to give a prepolymer; and condensation of this prepolymer by heating in the presence of at least 1 catalyst selected from the alkali metal hydroxides, alkaline-earth metal hydroxides, alkali metal fluorides, alkaline-earth metal fluorides, and triethylamine. Still another synthesis example is found in Japanese Patent Application Laid Open (Kokai or Unexamined) Number Hei 3-227321 (227,321/1991). This reference teaches the dissolution of alkali metal carboxylate and lower alcohol in a mixed liquid system that forms two phases (water and hydrocarbon solvent); the dropwise addition of methyltrihalosilane into this system to effect hydrolysis; and condensation by heating.

The polymethylsilsesquioxanes afforded by these methods share a characteristic feature: they are hard but brittle. Some of the preceding references even include tactics for addressing this problem. Japanese Patent Publication (Kokoku) Number Hei 1-43773 instructs regulating the fraction with molecular weight $\leq 20,000$ (molecular weight as determined by gel permeation chromatography (GPC) calibrated with polystyrene standards) to 15 to 30 weight % of the polymethylsilsesquioxane. However, even this does no more than enable the preparation of coatings with thicknesses of about 1.8 to 2.0 μm. Similarly, the technology in EP 0 406 911 A1 can only provide coatings with maximum thicknesses of 3 to 3.5 μm without cracking. At larger film thicknesses cracking occurs, and of course the flexibility that would permit the fabrication of an independent or stand-alone film is absent.

We have already discovered (see EP 786 489 A1 and WO 9707164) that a coating that combines flexibility with high thermal stability is provided by the cure of a polymethylsilsesquioxane having a molecular weight and hydroxyl content in specific ranges and preferably prepared by a special method.

On the subject of the silylation of the residual silanol in polysilsesquioxane, a synthetic method for this is disclosed in, for example, *J. Am. Chem. Soc.*, 1990, Volume 112, pages 1931 to 1936. Japanese Patent Application Laid Open (Kokai or Unexamined) Number Sho 61-221232 (221,232/1986) teaches a method for the preparation of silylated polysilsesquioxane comprising the use of silylating agent to terminate the reaction in the polysilsesquioxane synthesis method of EP 0 406 911 A1 and Japanese Patent Publication (Kokoku) Number Sho 62-16212. Japanese Patent Application Laid Open (Kokai or Unexamined) Numbers Hei 6-279586 (279,586/1994), Hei 6-287307 (287,307/1994), and Hei 7-70321 (70,321/1995) teach that stabilization can be achieved and gelation can be avoided by trimethylsilylation of the hydroxyl in polysilsesquioxane in which methyl constitutes 50 to 99.9 mole % of the pendant organic groups and crosslinking-reactive groups are present in the remaining organic groups. However, even without silylation the polymethylsilsesquioxane disclosed by us in EP 786 489 A1 and WO 9707164 does not gel during its preparation and can be stably stored at room temperature. Japanese Patent Application Laid Open (Kokai or Unexamined) Number Hei 5-125187 (125,187/1993) teaches that an increased storage stability can be obtained by trialkylsilylation of the hydroxyl in polysilsesquioxane having Mn $\geq 100,000$ and methyl as 50 to 100 mole % of its pendant organic groups. The above-referenced Japanese Patent Publication (Kokoku) Number Sho 62-16212 also teaches that silylation of the hydroxyl in polymethylsilsesquioxane improves stability.

On the subject of the organic groups in silsesquioxanes, silsesquioxanes functionalized with various crosslinking-reactive groups are described in, for example, *Chem. Rev.*, 1995, Volume 95, pages 1409 to 1430.

SUMMARY OF THE INVENTION

We have already discovered (see EP 786 489 A1 and WO 9707164) that a coating that combines flexibility with high thermal stability is provided by the cure of a polymethylsilsesquioxane having a molecular weight and hydroxyl content in specific ranges and preferably prepared by a special method. The polymethylsilsesquioxane disclosed by us in those publications contains a large amount of silanol but also exhibits an excellent storage stability. The cured products afforded by this polymethylsilsesquioxane exhibit a very high heat stability and also exhibit a flexibility that is largely unachievable by the cured products afforded by prior polymethylsilsesquioxanes. This high heat stability can be explained, inter alia, by the fact that a high post-cure crosslink density is obtained. This phenomenon should stand in direct opposition to the manifestation of flexibility by the cured film, and the manifestation of both these properties, i.e., flexibility and heat stability, is a unique characteristic of the polymethylsilsesquioxane under consideration. The object of the present invention is to provide a method for imparting functionality (the capacity to crosslink with the matrix polymer when the polymethylsilsesquioxane is used as a filler or additive for polymers or the ability for the subject polymethylsilsesquioxane to undergo cure by polyaddition or addition polymerization) to the subject polymethylsilsesquioxane with its unique characteristics by equipping it with functional groups.

The composition of the invention comprises a silylated polymethylsilsesquioxane. The composition of the invention is prepared by silylating the silanol groups in a starting polymethylsilsesquioxane having a predetermined number average molecular weight, Mn, from 380 to 2,000, as determined by gel permeation chromatography calibrated with polystyrene standards. The starting polymethylsilsesquioxane composition is represented by the general formula

$(CH_3SiO_{3/2})_n(CH_3Si(OH)O_{2/2})_m$ wherein m and n are positive numbers that provide the predetermined Mn, with the proviso that the value of $m/(m+n)$ is less than or equal to $0.152/(Mn \times 10^{-3})+0.10$ and greater than or equal to $0.034/(Mn \times 10^{-3})$. The silylated polymethylsilsesquioxane of the invention has the formula

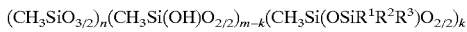

$(CH_3SiO_{3/2})_n(CH_3Si(OH)O_{2/2})_{m-k}(CH_3Si(OSiR^1R^2R^3)O_{2/2})_k$ wherein k is a positive number smaller than m, $(m-k)/(m+n)$ is less than or equal to 0.12, and $R^1$, $R^2$, and $R^3$ are each selected from the group consisting of substituted and unsubstituted monovalent hydrocarbon groups wherein at least one of said $R^1$, $R^2$, and $R^3$ is a group that contains a crosslinkable carbon—carbon double bond. Hence, the boundary conditions for the starting polymethylsilsesquioxane are known and can be represented graphically.

The present invention also encompasses the silylated polymethylsilsesquioxane synthesized by the above-described method and compositions comprising the silylated polymethylsilsesquioxane in combination with a polyorganosiloxane reactive therewith.

Figure 1:
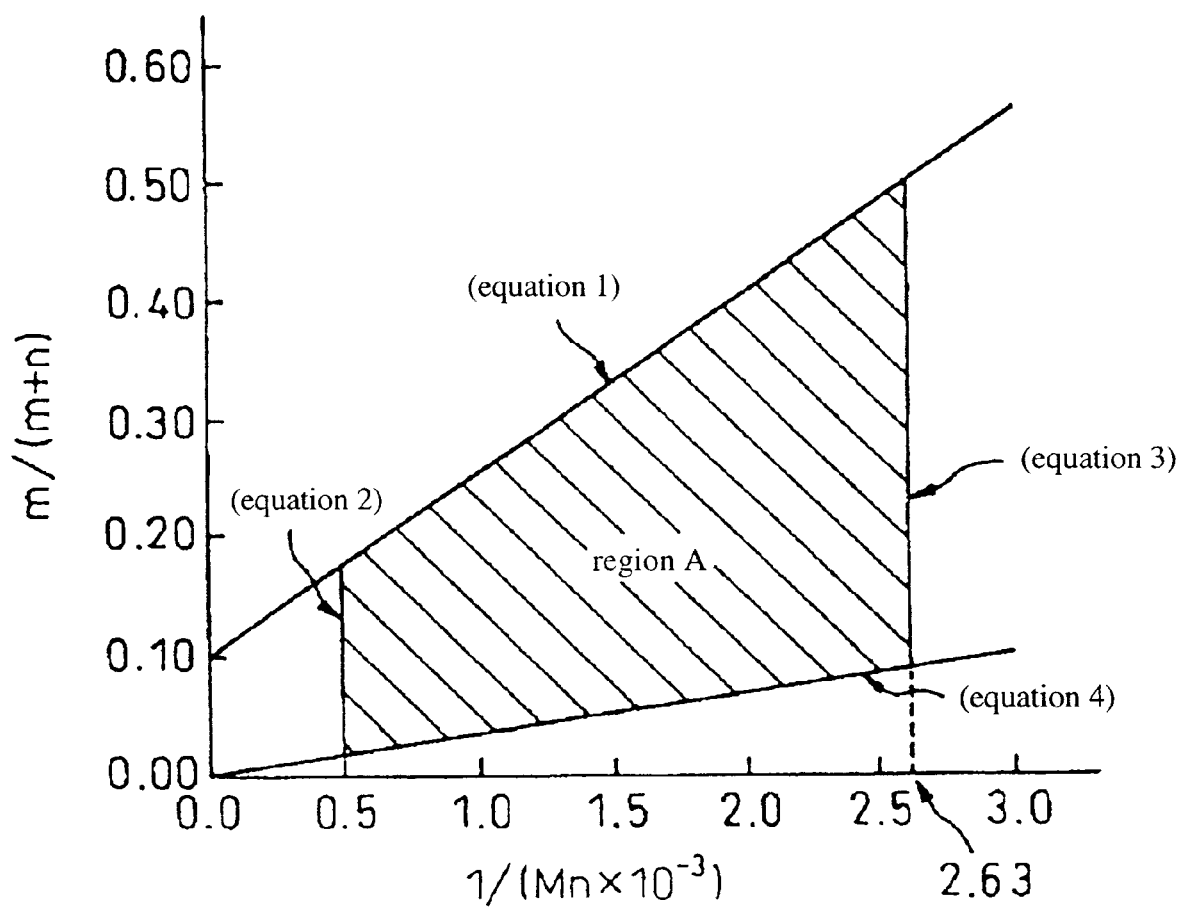
FIG. 1 is a graph of the ratio of $m/(m+n)$ vs. $1/(Mn \times 10^{-3})$ of the boundary conditions of the starting polymethylsilsesquioxane used to prepare the silylated composition of the invention, represented by the general formula $(CH_3SiO_{3/2})_n(CH_3Si(OH)O_{2/2})_m$, having a predetermined Mn from 380 and 2,000, as determined by gel permeation chromatography calibrated with polystyrene standards, and being defined by the region A bounded by equations.

(1) $m/(m+n)=0.152/(Mn \times 10^{-3})+0.10$;

(2) $1/(Mn \times 10^{-3})=1000/2000$;

(3) $1/(Mn \times 10^{-3})=1000/380$; and (4) $m/(m+n)=0.034/(Mn \times 10^{-3})$.

DETAILED DESCRIPTION OF THE INVENTION

The starting polymethylsilsesquioxane used to prepare the silylated polymethylsilsesquioxane of the present invention, has a number-average molecular weight (Mn, polystyrene basis) from 380 to 2,000 and is represented by

$(CH_3SiO_{3/2})_n(CH_3Si(OH)O_{2/2})_m$ where m and n are positive numbers that provide the specified molecular weight and the value of $m/(m+n)$ falls within region A in FIG. 1. Region A is the region enclosed by the straight lines with equations (1) to (4) in the graph in FIG. 1 in which the x-axis plots $1/(Mn \times 10^3)$ and the y-axis plots $m((m+n)$. Region A includes the intersections of the straight lines and the points on the straight lines defined by the following equations:

(1) $m/(m+n)=0.152/(Mn \times 10^{31\ 3})+0.10$ (2) $1/(Mn \times 10^{-3})=1000/2000$ (3) $1/(Mn \times 10^{-3})=1000/380$ (4) $m/(m+n)=0.034/(Mn \times 10^{-3})$ This starting polymethylsilsesquioxane is preferably prepared in a two-phase system of water and organic solvent consisting of oxygenated organic solvent and optionally up to 50 volume % (based on the oxygenated organic solvent) hydrocarbon solvent by hydrolyzing a methyltrihalosilane $MeSiX_3$ (Me=methyl and X=halogen atom) and condensing the resulting hydrolysis product. When this preparative method is not used, the cured product afforded by the subject starting polymethylsilsesquioxane will have a reduced flexibility and/or a reduced heat resistance even when the molecular weight and silanol content satisfy the ranges specified above. In other words, polymethylsilsesquioxane with the unique characteristics described above will not be obtained.

Optimal methods for synthesizing the starting polymethylsilsesquioxane having a molecular weight and hydroxyl content in the above-specified ranges are exemplified by the following:

(1) forming a two-phase system of water (optionally containing the dissolved salt of a weak acid with a buffering capacity or a dissolved water-soluble inorganic base) and oxygenated organic solvent, optionally containing no more than 50 volume % hydrocarbon solvent, adding the below-described (A) or (B) dropwise to this system to hydrolyze the methyltrihalosilane, and effecting condensation of the resulting hydrolysis product, wherein (A) is a methyltrihalosilane $MeSiX_3$ (Me=methyl and X=halogen atom) and (B) is the solution afforded by dissolving such a methyltrihalosilane in oxygenated organic solvent optionally containing no more than 50 volume % hydrocarbon solvent;

(2) the same method as described under (1), but in this case effecting reaction in the two-phase system from the dropwise addition of the solution described in (B) to only water;

(3) the same method as described under (1), but in this case effecting reaction in the two-phase system from the simultaneous dropwise addition of water and the solution described in (B) to an empty reactor.

"X" the halogen in the subject methyltrihalosilane, is preferably bromine or chlorine and more preferably is chlorine. As used herein, the formation of a two-phase system of water and organic solvent refers to a state in which the water and organic solvent are not miscible and hence will not form a homogeneous solution. This includes the maintenance of a layered state by the organic layer and water layer through the use of slow-speed stirring as well as the generation of a suspension by vigorous stirring. Below these phenomena are referred to as the "formation of two layers".

The organic solvent used in the subject preparative methods is an oxygenated organic solvent that can dissolve the methyltrihalosilane and, although possibly evidencing some solubility in water, can nevertheless form a two-phase system with water. The organic solvent can contain up to 50 volume % hydrocarbon solvent. The use of more than 50 volume % hydrocarbon solvent is impractical because this causes gel production to increase at the expense of the yield of target product. Even an organic solvent with an unlimited solubility in water can be used when such a solvent is not miscible with the aqueous solution of a water-soluble inorganic base or with the aqueous solution of a weak acid salt with a buffering capacity.

The oxygenated organic solvents are exemplified by, but not limited to, ketone solvents such as methyl ethyl ketone, diethyl ketone, methyl isobutyl ketone, acetylacetone, cyclohexanone, and so forth; ether solvents such as diethyl ether, di-n-propyl ether, dioxane, the dimethyl ether of diethylene glycol, tetrahydrofuran, and so forth; ester solvents such as ethyl acetate, butyl acetate, butyl propionate, and so forth; and alcohol solvents such as n-butanol, hexanol, and so forth. The ketone, ether, and ester solvents are particularly preferred among the preceding. The oxygenated organic solvent may also take the form of a mixture of two or more selections from the preceding. The hydrocarbon solvent is exemplified by, but again not limited to, aromatic hydrocarbon solvents such as benzene, toluene, xylene, and so forth; aliphatic hydrocarbon solvents such as hexane, heptane, and so forth; and halogenated hydrocarbon solvents such as chloroform, trichloroethylene, carbon tetrachloride, and so forth. The quantity of the organic solvent used is not critical, but preferably is in the range from 50 to 2,000 weight parts per 100 weight parts of the methyltrihalosilane. The use of less than 50 weight parts organic solvent per 100 weight parts methyltrihalosilane is inadequate for dissolving the starting polymethylsilsesquioxane product and, depending on the circumstances, will not give a starting polymethylsilsesquioxane having the desired molecular weight range, resulting in too high a molecular weight. The use of more than 2,000 weight parts organic solvent can lead to slow the hydrolysis and condensation of the methyltrihalosilane and hence result in the failure to obtain a starting polymethylsilsesquioxane in the desired molecular weight range. While the quantity of water used is also not critical, the water is preferably used at from 10 to 3,000 weight parts per 100 weight parts methyltrihalosilane.

Hydrolysis and condensation reactions are also possible even with the use of entirely additive-free water as the aqueous phase. However, such a system will give a polymethylsilsesquioxane product with an elevated molecular weight because the reaction is accelerated by the hydrogen chloride evolved from the chlorosilane. Polymethylsilsesquioxane with a relatively lower molecular weight can therefore be synthesized through the addition of water-soluble inorganic base capable of controlling the acidity or a weak acid salt with a buffering capacity.

Such water-soluble inorganic bases are exemplified by water-soluble alkalis such as the lithium, sodium, potassium, calcium, and magnesium hydroxides. The subject weak acid salt with a buffering capacity is exemplified by, but not limited to, carbonates such as the sodium, potassium, calcium, and magnesium carbonates; bicarbonates such as the sodium and potassium bicarbonates; oxalates such as potassium trihydrogen bis(oxalate); carboxylates such as potassium hydrogen phthalate and sodium acetate; phosphates such as disodium hydrogen phosphate and potassium dihydrogen phosphate; and borates such as sodium tetraborate. These are preferably used at $\leq 1.8$ gram-equivalents per 1 mole halogen atoms from the trihalosilane molecule. In other words, these are preferably used at up to 1.8 times the quantity that just neutralizes the hydrogen halide that is produced when the halosilane is completely hydrolyzed. The use of larger amounts facilitates the production of insoluble gel. Mixtures of two or more of the water-soluble inorganic bases and mixtures of two or more of the buffering weak acid salts can be used as long as the total is within the above-specified quantity range.

The methyltrihalosilane hydrolysis reaction bath can be stirred slowly at a rate that maintains two layers (aqueous phase and organic solvent) or can be strongly stirred so as to give a suspension. The reaction temperature is suitably in the range from room (20° C.) temperature to 120° C. and is preferably from about 40° C. to 100° C.

The starting polymethylsilsesquioxane according to the present invention may contain small amounts of units that originate from impurities that may be present in the precursors, for example, units bearing non-methyl lower alkyl, monofunctional units as represented by $R_3SiO_{1/2}$, difunctional units as represented by $R_2SiO_{2/2}$, and tetrafunctional units as represented by $SiO_{4/2}$. The starting polymethylsilsesquioxane under consideration contains the OH group and has the structure specified by the structural formula given above; however, it may also contain very small levels of OH-functional units with structures other than that specified in the said structural formula. Thus, the starting polymethylsilsesquioxane according to the present invention has a structure that substantially satisfies the conditions specified hereinabove, but it may also contain structural units generated by the causes outlined above within a range that does not impair the characteristic features of said polymethylsilsesquioxane.

The $R^1$, $R^2$, and $R^3$ in the silyl group that silylates the hydroxyl in the starting polymethylsilsesquioxane are each selected from substituted and unsubstituted monovalent hydrocarbon groups on the condition that at least one of $R^1$, $R^2$, and $R^3$ contains a crosslinkable carbon—carbon double bond. The group containing a crosslinkable carbon—carbon double bond is exemplified by vinyl, (meth)acryloyl, and alkenyl. The remaining unreactive groups are exemplified by alkyl such as methyl, ethyl, and propyl; aryl such as phenyl; and organic groups as afforded by halogen substitution in the preceding.

The technique for silylating the hydroxyl in the starting polymethylsilsesquioxane with a reactive substituent-bearing silyl group is exemplified by reaction with halosilane bearing the three substituents $R^1$, $R^2$, and $R^3$ described above; use of a nitrogenous silylating agent such as, for example, N,N-diethylarninosilane, N-silylacetamide, or hexasubstituted disilazane; reaction with a trisubstituted silanol; and reaction with hexasubstituted disiloxane in a weakly acidic milieu. When a halosilane is employed, a base can also be present in the system in order to neutralize the hydrogen halide by-product. In the case of reaction with a nitrogenous silylating agent, a catalyst such as trimethylchlorosilane or ammonium sulfate can be added. The silylation reaction under consideration can be run in the presence or absence of solvent. Solvents suitable for this reaction are, for example, aromatic hydrocarbon solvents such as benzene, toluene, and xylene; aliphatic hydrocarbon solvents such as hexane and heptane; ether solvents such as diethyl ether and tetrahydrofuran; ketone solvents such as acetone and methyl ethyl ketone; ester solvents such as ethyl acetate and butyl acetate; halogenated hydrocarbon solvents such as chloroform, trichloroethylene, and carbon tetrachloride; dimethylformamide; and dimethyl sulfoxide.

The subject silylation reaction is suitably run at from 0° C. to 200° C. and preferably at from 0° C. to 140° C.

The silylated polymethylsilsesquioxane prepared as described above exhibits good compatibility with certain polyorganosiloxanes and can therefore be used to prepare compositions. In addition, reaction of these compositions in the presence of curing catalyst can provide cured products with excellent physical properties. Typical examples of the subject polyorganosiloxanes are provided below, but these examples should not be construed as exhaustive.

(i) Alkenyl-functional organopolysiloxanes

These are organopolysiloxanes with the general formula $R^4{}_a R^5{}_b SiO_{(4-a-b)/2}$ ($R^4$=alkenyl, $R^5$=$C_1$ to $C_3$ alkyl, a is a number that provides at least two $R^4$ in each molecule, and $1.8 \leq a+b \leq 2.3$) that have a viscosity at 25° C. from 100 to 100,000 centipoise. Their viscosity is preferably from 100 to 50,000 centipoise and more preferably is from 300 to 10,000 centipoise.

These alkenyl-functional organopolysiloxanes can be exemplified by the following structures.

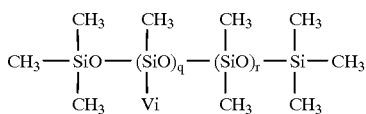

(Vi=vinyl and q and r are numbers within ranges that satisfy the conditions given above)

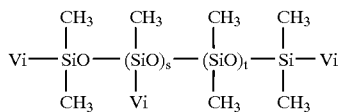

(Vi=vinyl and s and t are numbers within ranges that satisfy the conditions given above)

(ii) Organohydrogenpolysiloxanes

These are organohydrogenpolysiloxanes with the general formula $R^6{}_a H_b SiO_{(4-a-b)/2}$ ($R^6$=$C_1$ to $C_3$ alkyl, b is a number that provides at least three hydrogen atoms in each molecule, and $1.8 \leq a+b \leq 2.3$) that have a viscosity at 25° C. from 1 to 100,000 centipoise. Their viscosity is preferably from 100 to 50,000 centipoise and more preferably is from 1,000 to 10,000 centipoise.

These organohydrogenpolysiloxanes can be exemplified by the following structures.

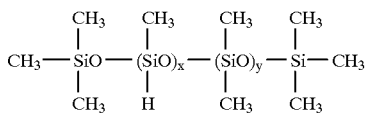

x and y are numbers within ranges that satisfy the conditions given above)

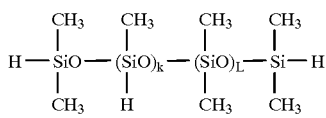

(k and L are numbers within ranges that satisfy the conditions given above)

Dimethylpolysiloxanes and phenyl-functional polysiloxanes are examples of other applicable polyorganosiloxanes.

The subject polyorganosiloxanes may also be copolymers with, for example, polyalkylene oxide, e.g., polyethylene oxide or polypropylene oxide, and may even contain tetrafunctional and/or trifunctional units, in each case insofar as the above-described good compatibility is evidenced.

Curable compositions comprising the following components (1), (2), and (3) are preferred compositions according to the present invention wherein:

component (1) is an alkenyl-functional silylated polymethylsilsesquioxane in accordance with the invention; component (2) is a polysiloxane compound that contains on average at least 2 hydrogen atoms directly bonded to silicon in each molecule; and component (3) is a curing catalyst.

The above-defined curable compositions may also contain the following component (4): an organopolysiloxane that contains on average at least 2 crosslinkable carbon—carbon double bonds in each molecule.

The curable compositions of the invention include a component (1), a component (2) reactive with component (1), a curing catalyst (3), and, depending on the particular purpose, the organopolysiloxane described as component (4).

The nature of the organohydrogenpolysiloxane (2) is not critical as long as it is reactive with at least component (1) and can thereby provide a curable composition. The subject organohydrogenpolysiloxane is specifically exemplified by straight-chain organohydrogenpolysiloxanes, branched organohydrogenpolysiloxanes, hydridodimethylsilylated polymethylsilsesquioxanes, and hydrosilyl group-functional silicone resins.

Compositions containing the subject silylated polymethylsilsesquioxane and polyorganosiloxane can be prepared by simply mixing these components when the polyorganosiloxane has a low viscosity. When the polyorganosiloxane has a high viscosity, these compositions can be prepared, for example, by a compounding-type blending method using a kneader or by dissolving the two components in organic solvent. This organic solvent is not critical as long as it has the capacity to dissolve both components to yield a homogeneous solution, and it can be exemplified by the aromatic hydrocarbon solvents, aliphatic hydrocarbon solvents, halogenated hydrocarbon solvents, ketone solvents, ether solvents, and ester solvents described above.

EXAMPLES

The present invention is explained in greater detail in the following through working and comparative examples, but is not limited to these examples.

Reference Example 1

63.5 g (0.60 mol) sodium carbonate and 400 mL water were introduced into a reactor equipped with a reflux condenser, addition funnel, and stirrer. 400 mL methyl isobutyl ketone was added while stirring. The stirring rate was sufficiently slow that the organic layer and aqueous layer remained intact. Into this was gradually added 74.7 g (0.5 mol) methyltrichlorosilane dropwise from the addition funnel. During this period the temperature of the reaction mixture rose to 50° C. The reaction mixture was then heated and stirred on an oil bath at 60° C. for an additional 24 hours. After completion of the reaction, the organic layer was washed with water until the wash water reached neutrality and was then dried over a drying agent. The drying agent was subsequently removed and the solvent was distilled off at reduced pressure. Drying overnight in a vacuum then gave a starting polymethylsilsesquioxane as a white solid. The following results were obtained when the molecular weight distribution of this starting polymethylsilsesquioxane was measured by GPC calibrated with polystyrene standards (solvent chloroform, columns=2×TSKgelGMH$_{HR}$-L (brand name) from Tosoh, instrument=HLC-8020 from Tosoh): weight-average molecular weight=3,270; number-average molecular weight=920. The hydroxyl group content as determined from the $^{29}$Si-NMR spectrum (measured with an ACP-300 from Bruker) was 0.22 per silicon atom (this 0.22 corresponded to the value of m/(m+n)).

Reference Example 2

While stirring 2 L water and 1.5 L methyl isobutyl ketone in a reactor as described in Reference Example 1 with sufficient vigor that 2 layers did not form, 745 g (5.0 mol) methyltrichlorosilane dissolved in 0.5 L methyl isobutyl ketone was gradually added dropwise at a rate such that the temperature of the reaction mixture did not exceed 50° C. The reaction mixture was then additionally stirred and heated for 2 hours on an oil bath at 50° C. Work up as in Reference Example 1 gave a starting polymethylsilsesquioxane as a white solid. Analysis of the molecular weight distribution of this starting polymethylsilsesquioxane as in Reference Example 1 gave the following results: weight-average molecular weight=9,180; number-average molecular weight=1,060. 0.22 hydroxyl per silicon atom was determined.

Example 1

The interior atmosphere of a reactor equipped with a reflux condenser, addition funnel, and stirrer was replaced with argon; 3.0 g of the polymethylsilsesquioxane described in Reference Example 1 was added; this polymethylsilsesquioxane was dissolved in 9 mL methyl isobutyl ketone; and 1.47 g triethylamine was added. 1.83 g vinyldimethylchlorosilane was added dropwise over 1 minute while stirring and the reaction was then continued for 2 hours at room temperature. After terminating the reaction by the addition of water, the organic layer was washed with water until the wash water reached neutrality. The organic layer was then dried (over a drying agent. The drying agent was removed and the solvent was distilled off under reduced pressure. Drying in a vacuum for 2 days gave 2.37 g vinyldimethylsilylated polymethylsilsesquioxane as a solid with a very slight fluidity. The residual hydroxyl content as calculated from the $^{29}$Si-NMR spectrum was 0.06 per silicon atom in the silsesquioxane skeleton (this 0.06 corresponded to the value of (m–m/(m+n)).

0.88 g of this vinyldimethylsilylated polymethylsilsesquioxane and 3.5 g polydimethylsiloxane bearing vinyl at both terminals and having a vinyl content of 0.12 weight % and a viscosity of 9,000 centistokes (20:80 weight ratio) were dissolved in 4.4 g toluene with thorough stirring. This was followed by the addition of a platinum-divinyltetramethyldisiloxane complex to give 200 ppm platinum atoms relative to vinyl, 0.00028 g 2-methyl-3-butyn-2-ol, and 0.21 g crosslinker with the following formula.

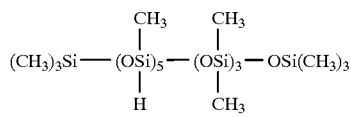

After removal of the solvent, curing was carried out for 12 hours at 100° C. to give a polymethylsilsesquioxane-containing silicone rubber film. This film presented an excellent transparency, which confirmed good compatibility between the silylated polymethylsilsesquioxane and the polydimethylsiloxane.

Example 2

Using a reactor as described in Example 1, 70 g of the polymethylsilsesquioxane described in Reference Example 2 was dissolved in 210 mL methyl isobutyl ketone. Amine was not used. 41.0 g vinyldimethylchlorosilane was added dropwise over 3 minutes on an ice bath followed by reaction for 1 hour at room temperature. Work up as in Example 1 gave 71.6 g vinyldimethylsilylated polymethylsilsesquioxane as a solid with a very slight fluidity. The residual hydroxyl content as calculated from the $^{29}$Si-NMR spectrum was 0.05 per silicon atom in the silsesquioxane skeleton.

Using this vinyldimethylsilylated polymethylsilsesquioxane and the polydimethylsiloxane described in Example 1 (vinyl at both terminals) at a 20:80 weight ratio, curing was carried out as in Example 1 to give a homogeneous silicone rubber film that contained polymethylsilsesquioxane.

This film was subjected to tensile testing as described in JIS K 6301. Yielding was not exhibited in the stress-strain curve, and the 10% modulus (stress divided by strain at 10% strain) was 1.3 MPa, which indicated a reinforcing effect since a value of 0.5 MPa was obtained in the absence of the silylated polymethylsilsesquioxane.

Dynamic tests were also run based on JIS K 6394 at a test temperature of 20° C. and a test frequency of 1 Hz. The shear modulus of the film containing the vinyldimethylsilylated polymethylsilsesquioxane was 33 Mpa, which was 2.5-times larger than the 13 MPa obtained in the absence of the vinyldimethylsilylated polymethylsilsesquioxane.

Example 3

Using the vinyldimethylsilylated polymethylsilsesquioxane described in Example 2 and the polydimethylsiloxane described in Example 1 (vinyl at both terminals) at a 40:60 weight ratio, and hydrogen-functional crosslinker curing was carried out as in Example 1 to give a very transparent silicone rubber film that contained polymethylsilsesquioxane. Tensile testing was run on this film as in Example 2 and a 10% modulus of 8.0 MPa was found. An additional increase in reinforcing activity was thus seen since this value was 16-times that in the absence of the silylated polymethylsilsesquioxane and 6-times that for the 20:80 silsesquioxane: polydimethylsiloxane weight ratio.

Dynamic tests were also run as in Example 2 at a test temperature of 20° C. and a test frequency of 1 Hz. The shear modulus of the film containing the vinyldimethylsilylated polymethylsilsesquioxane was 82 MPa, which as in the case of tensile testing indicated an additional increase in reinforcing activity.

Example 4

1.75 g vinyldimethylsilylated polymethylsilsesquioxane as described in Example 2 and 0.38 g crosslinker as described in Example 1 were dissolved in 1.8 g toluene. To the resulting solution were added a platinum-divinyltetramethyldisiloxane complex in sufficient quantity to give 200 ppm platinum atoms relative to vinyl and 0.00042 g 2-methyl-3-butyn-2-ol. Curing was then carried out for 12 hours at 100° C. and 2 hours at 130° C. to give a cured polymethylsilsesquioxane film. This film was subjected to tensile-mode dynamic viscoelastic testing at a test temperature of 20° C. and a test frequency of 1 Hz: a storage modulus of 0.9 to 1.0 GPa was measured. This cured film had the same flexibility as the cured product afforded by condensation of the silanol in the polymethylsilsesquioxane disclosed by the present inventors in EP 786 489 A1 and WO 9707164. When a stand-alone film with a thickness of 200 μm was subjected to flexural testing using the flexural tester of JIS K-5400, the film did not break or crack even when bent 180° over a rod with a diameter of 10 mm.

Reference Example 3

Using a reactor as described in Example 1, 10.8 g of the polymethylsilsesquioxane described in Reference Example 2 was dissolved in 30 mL methyl isobutyl ketone. 5.02 g dimethylchlorosilane was added dropwise over 1 minute while stirring on an ice bath followed by reaction for 2 hours at room temperature. After terminating the reaction by the addition of water, the organic layer was washed with water until the wash water reached neutrality. The organic layer was then dried over a drying agent. The drying agent was removed and the solvent was distilled off under reduced pressure. Drying in a vacuum for 2 days gave 11.3 g hydridodimethylsilylated polymethylsilsesquioxane as a high-viscosity liquid. The residual hydroxyl content as calculated from the $^{29}$Si-NMR spectrum was 0.05 per silicon atom in the silsesquioxane skeleton.

Example 5

Proceeding as in Example 4, a cured polymethylsilsesquioxane film was prepared from the combination of 1.70 g of the vinyldimethylsilylated polymethylsilsesquioxane described in Example 2, 1.56 g of the hydridodimethylsilylated polymethylsilsesquioxane described in Reference Example 3, and the platinum-divinyltetramethyldisiloxane complex and 2-methyl-3-butyn-2ol in the same proportions as in Example 4 and by heating as in Example 4. A storage modulus of 2 GPa was measured when this film was subjected to dynamic viscoelastic testing as in Example 4 at a test temperature of 20° C. and a test frequency of 1 Hz. This cured film had the same flexibility as the cured product afforded by condensation of the silanol in the polymethylsilsesquioxane disclosed by the present inventors in EP 786 489 A1 and WO 9707164. When a stand-alone film with a thickness of 90 μm was subjected to flexural testing using the flexural tester of JIS K-5400, the film did not break or crack even when bent 180° over a rod with a diameter of 2 mm.

Comparative Example 1

The fabrication of polymethylsilsesquioxane-containing silicone rubber films was attempted by curing as described in Example 1 using the unsilylated starting polymethylsilsesquioxane described in Reference Example 2 and the vinyl-endblocked polydimethylsiloxane described in Example 1 in weight ratios of 20:80 and 40:60. In this case, however, dispersion was not as easy as for the vinyldimethylsilylated polymethylsilsesquioxane. The cured films afforded by these blends were opaque and could not be subjected to the mechanical property measurements.

Reference Example 4

Using a reactor as described in Example 1, 70 g of the starting polymethylsilsesquioxane described in Reference Example 2 was dissolved in 210 mL methyl isobutyl ketone and 35.4 g triethylamine was also added. 38.3 g trimethylchlorosilane was added dropwise over 17 minutes followed by reaction for 2 hours at room temperature. Work up as in Example 1 gave 72.1 g trimethylsilylated polymethylsilsesquioxane as a white solid. The residual hydroxyl content as calculated from the $^{29}$Si-NMR spectrum was 0.06 per silicon atom in the silsesquioxane skeleton.

Comparative Example 2

Two polymethylsilsesquioxane-containing silicone rubber films were fabricated by curing as described in Example 1 using the trimethylsilylated polymethylsilsesquioxane described in Reference Example 4 and the vinyl-endblocked polydimethylsiloxane described in Example 1 in weight ratios of 20:80 and 40:60. These films were highly transparent, which indicated good compatibility between the silylated polymethylsilsesquioxane and the polydimethylsiloxane. These films were subjected to tensile testing as described in Example 2. The film fabricated at a silylated polymethylsilsesquioxane : polydimethylsiloxane weight ratio of 20:80 had a 10% modulus of 1.0 MPa (elongation at break of 190%), which was near the value of 1.3 MPa (elongation at break of 190%) obtained in Example 2. However, in Example 2 the test specimen remained transparent until failure, while in this comparative example the trimethylsilylated silsesquioxane-containing test specimen underwent whitening when the strain went beyond 50%—which would be problematic for practical application. In addition, the film fabricated at a trimethylsilylated silsesquioxane : polydimethylsiloxane weight ratio of 40:60 had a 10% modulus of 0.5 MPa, which was smaller than the value for the 20:80 weight ratio film and the same as the 0.5 MPa value obtained in the absence of the silylated polymethylsilsesquioxane, i.e., no reinforcing activity was observed. This value in Example 3 was 8.0 Mpa.These observations can be explained as follows: since no crosslinking occurred between the polydimethylsiloxane and the trimethysilylated silsesquioxane in this comparative example, the trimethylsilylated silsesquioxane functioned as a filler at the smaller addition, but functioned as a plasticizer at the larger addition.

When dynamic property testing was carried out as in Example 2 at a test temperature of 20° C. and a test frequency of 1 Hz, a shear modulus of 17 MPa was obtained at the trimethylsilylated polymethylsilsesquioxane : polydimethylsiloxane weight ratio of 20:80 and a shear modulus of 30 MPa was obtained at the 40:60 weight ratio. These values were lower than the values obtained in Examples 2 and 3 using vinyldimethylsilylated polymethylsilsesquioxane. In addition, there was less difference from Examples 2 and 3 in the dynamic testing data than in the static tensile testing (vide supra). The explanation for this apparently resides in the fact that the deformation during testing was in the linear region, with the result that the absence of crosslinking between the silsesquioxane and polydimethylsiloxane did not exercise a dispositive influence.

What is claimed is:

1. A composition comprising a silylated polymethylsilsesquioxane, said composition being prepared by silylating a starting polymethylsilsesquioxane having a predetermined number average molecular weight, Mn, from 380 to 2,000, as determined by gel permeation chromatography calibrated with polystyrene standards, said starting polymethylsilsesquioxane being represented by the general formula

$(CH_3SiO_{3/2})_n(CH_3Si(OH)O_{2/2})_m$ wherein m and n are positive numbers that provide the predetermined Mn, with the proviso that the value of m/(M+ n) is less than or equal to $0.152/(Mn \times 10^{-3})+0.10$ and greater than or equal to $0.034/(Mn \times 10^{-3})$;

said silylated polymethylsilsesquioxane having the formula $$(CH_3SiO_{3/2})_n(CH_3Si(OH)O_{2/2})_{m-k}(CH_3Si(OSiR^1R^2R^3)O_{2/2})_k$$

wherein k is a positive number smaller than m, (m−k/(m+n) is less than or equal to 0.12, and $R^1$, $R^2$, and $R^3$ are each selected from substituted and unsubstituted monovalent hydrocarbon groups wherein at least 1 of said $R^1$, $R^2$, and $R^3$ is a group that contains a crosslinkable carbon—carbon double bond.

2. A silylated polymethylsilsesquioxane according to claim 1, wherein the starting polymethylsilsesquioxane is prepared by hydrolyzing a methyltrihalosilane of the general formula $MeSiX_3$, wherein Me is methyl and X is a halogen atom, and condensing the resulting hydrolysis product, and wherein said preparation is carried out in a two-phase system of water and organic solvent comprising oxygenated organic solvent and up to 50 volume %, based on the oxygenated organic solvent, of a hydrocarbon solvent.

3. A silylated polymethylsilsesquioxane in accordance with claim 1, wherein said $R^1$, $R^2$, and $R^3$ are monovalent hydrocarbon groups selected from the group consisting of methyl, vinyl and hexenyl groups.

4. A composition in accordance with claim 1 further comprising a polysiloxane compound having an average at of least 2 silicon-bonded hydrogen atoms in each molecule and a hydrosilation curing catalyst.

5. A composition in accordance with claim 4 further comprising an organopolysiloxane having an average of at least 2 crosslinkable carbon—carbon double bonds in each molecule.

* * * * *